US011244060B2

(12) United States Patent
Kurian

(10) Patent No.: US 11,244,060 B2
(45) Date of Patent: Feb. 8, 2022

(54) FEDERATED SMART USER IDENTIFICATION WITH EMBEDDED COMPUTING SYSTEM ENTITLEMENTS

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 419 days.

(21) Appl. No.: 16/175,061

(22) Filed: Oct. 30, 2018

(65) Prior Publication Data

US 2020/0134203 A1 Apr. 30, 2020

(51) Int. Cl.
*G06F 21/60* (2013.01)
*G06F 21/31* (2013.01)
*G06F 21/62* (2013.01)

(52) U.S. Cl.
CPC ............ *G06F 21/602* (2013.01); *G06F 21/31* (2013.01); *G06F 21/62* (2013.01)

(58) Field of Classification Search
CPC ........ G06F 21/602; G06F 21/31; G06F 21/62; G06F 2221/2111; G06F 2221/2137; G06F 2221/2141; G06F 21/335; H04L 63/08; H04L 63/10; H04L 63/00; H04W 12/00
See application file for complete search history.

(56) References Cited

U.S. PATENT DOCUMENTS

| | | | |
|---|---|---|---|
| 6,889,210 B1 * | 5/2005 | Vainstein | G06F 21/6209 380/201 |
| 7,085,840 B2 | 8/2006 | de Jong et al. | |
| 7,188,358 B1 | 3/2007 | Hisada et al. | |
| 7,493,655 B2 | 2/2009 | Brown | |
| 7,657,639 B2 | 2/2010 | Hinton | |
| 7,860,882 B2 | 12/2010 | Hinton et al. | |
| 8,370,914 B2 | 2/2013 | Dalzell et al. | |
| 8,561,161 B2 | 10/2013 | Blakley, III et al. | |
| 8,689,287 B2 | 4/2014 | Bohmer et al. | |
| 8,756,674 B2 | 6/2014 | Ronda et al. | |
| 8,887,250 B2 | 11/2014 | Kuzin et al. | |
| 9,148,285 B2 | 9/2015 | Chang et al. | |
| 9,191,381 B1 | 11/2015 | Popp et al. | |

(Continued)

OTHER PUBLICATIONS https://www.nccoe.nist.gov/sites/default/files/library/project-descriptions/privacy-enhanced-identity-federation-project-description-final.pdf.

*Primary Examiner* — Robert B Leung
*Assistant Examiner* — Bruce S Ashley
(74) *Attorney, Agent, or Firm* — Moore & Van Allen PLLC; James C. Edwards

(57) ABSTRACT

A federated smart user identification (ID) having embedded tiered/hierarchical entitlements. The federated smart user ID comprises an encrypted key having multiple key strings that create sub-zones/barriers within the key. Each key string includes logical code and is attached/associated with at least one of (i) a computing system, service, application or the like, and (ii) an entitlement zone of the system, service, application or the like. Thus, the individual key strings define which systems, services, applications and the like the user has access to and the entitlements/authorizations within those systems, services, applications that the user has. In addition, key strings can dynamically be added to or deleted from the key to thereby change system/service access authorization and/or system/service-level entitlement.

17 Claims, 5 Drawing Sheets

(56) References Cited

U.S. PATENT DOCUMENTS

| | | | |
|---|---|---|---|
| 9,237,020 B2 | 1/2016 | Chang et al. | |
| 9,712,322 B2 | 7/2017 | Chang et al. | |
| 9,736,153 B2 | 8/2017 | McDaniel et al. | |
| 9,779,233 B2 | 10/2017 | Mukherjee et al. | |
| 10,038,563 B2 | 7/2018 | Gaddam et al. | |
| 2003/0038707 A1 | 2/2003 | Geller | |
| 2009/0276622 A1* | 11/2009 | Matsuo | G06F 21/31 713/155 |
| 2010/0187303 A1 | 7/2010 | Eckert et al. | |
| 2011/0221568 A1* | 9/2011 | Giobbi | H04W 4/80 340/5.82 |
| 2013/0305320 A1* | 11/2013 | Warrick | G06F 21/31 726/4 |
| 2015/0227727 A1* | 8/2015 | Grigg | G06F 21/31 726/4 |
| 2017/0124303 A1* | 5/2017 | Baldwin | G06Q 30/0635 |

* cited by examiner

US 11,244,060 B2

FEDERATED SMART USER IDENTIFICATION WITH EMBEDDED COMPUTING SYSTEM ENTITLEMENTS

FIELD OF THE INVENTION

The present invention is generally directed to computer security and, more specifically, providing for a federated smart user identification (ID) having embedded tiered computer system entitlements/authorizations.

BACKGROUND

In conventional computing environments user identification (i.e., user ID) is typically one-dimensional. This means that a user may have one user ID to identify themselves with one computing system, application or the like (e.g., an email address) and may have another user ID to identify themselves with another computing system, application or the like (e.g., randomly generated user ID so as to not readily identify the user). However, not only does this place a burden on the user to remember their user ID for a specified computing system, application or the like but for large enterprises (e.g., place of employment), which provide a user access to multiple computing systems, services, applications and the like, they present difficulty in assessing which users have access to which computing systems, service, applications and the like and monitoring the usage on a user-level. Therefore, such problems have recently resulted in the pursuit of federated IDs, in which a single user ID (or multiple IDs connected to a single user ID) is implemented across multiple, and in some instances most if not all, computing systems, service, applications and the like within one or more enterprises.

In certain instances, when a user logins into a computing system, service, application or the like (i.e., provides requisite user credentials, such as a user name and passcode/biometric data or the like), the system, service, application or the like may access a back-end database to not only verify that the user has access to the system, service, application or the like, but also identify the entitlements/authorizations associated with the user with regards to the corresponding system, service, application or the like. Such, entitlements/authorizations may include, but are not limited to, the data or portions/sections of the system, service, application the user is authorized/entitled to access, the functions (e.g., read data, write data, edit data, copy data, move data or the like) the user is authorized to perform within the system, service, application and the like. However, such storage of entitlements/authorizations at the database-level can be problematic. Specifically, if the database is down (e.g., due to maintenance or error) a user may not be capable of obtaining authorization to the system, service application or the like and/or be provide the requisite entitlements. Moreover, by having the entitlements/authorizations stored at the database-level, the entitlements/authorizations may be susceptible to unauthorized attacks/hacks, resulting in the entitlements/authorizations being changed (e.g., entitlements authorizations being illegally added or deleted for one or more users).

Therefore a need exists to develop systems, apparatus, methods and the like not only provide for a federated user ID that can be used across multiple systems, services, applications and the like to not only identify the user but also provide the user with system/service/application-specific entitlements/authorizations. In addition, a need exists to provide a user ID that provide hierarchal or tiered entitlements/authorizations to a user and for dynamically changing the entitlements/authorizations provided to the user based on other factors, such as security related factors and the like. Moreover, the desired systems, apparatus, methods and the like should avoid having to store the entitlements/authorizations within a database, thereby eliminating concerns over database availability and/or unauthorized access of the database. Additionally, the desired systems, apparatus, methods or the like should provide for a user ID that is concealed from the user, such that, the user is unaware of their specific user ID and, thus, may also be unaware of the entitlements/authorizations associated with the user ID.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for a federated smart user identification (ID) having embedded tiered/hierarchical entitlements. The federated nature of the user ID means that the user ID is configured to provide access to multiple different computing systems, services, applications or the like, in some instance, most if not all, systems, service, applications or the like that require authorization within an enterprise.

The federated smart user ID of the present invention comprises an encrypted key having multiple key strings, otherwise referred to herein as "pads" that create sub-zones/barriers within the key. Each key string or pad includes logical code and is attached/associated with at least one of a (i) a computing system, service, application or the like, and (ii) an entitlement zone of the system, service, application. Thus, the individual key strings define which systems, services, applications and the like the user has access to and the entitlements/authorizations within those systems, services, applications that the user has. Further, as explained further below, the tiered/hierarchal entitlement zones of the present invention allow for greater granularity in the entitlements/authorizations that may be provided to a user.

In accordance with specific embodiments of the invention, the key strings are dynamic, such that, key strings may be added or deleted from the key or otherwise changed/reconfigured as a means for adding or deleting to a user's access privileges and/or entitlements/authorizations. Such changes to the key strings may occur based on the user's need to gain or, in some instances, decrease further access or functionality within a system, service, application or the like. As discussed in more detail below other factors, such as time, user location, user system/service usage may be used in determining the need to change key strings (i.e., add or delete access privileges and/or entitlements/authorizations).

In specific embodiments, the user ID is a digital token stored in a user device (e.g., mobile device, smart watch/bracelet, key fob, USB flash drive or the like). The digitized user ID, typically with encryption over the top, means that the user has no knowledge of the user ID (such as a user name or the like, as typical of conventional user IDs) and the entitlements/authorizations provided to the user.

Since the entitlements/authorizations are stored within the user ID/key there is no need to retrieve the entitlements/authorizations from a database at the time of authorization. This means that problems associated with the database being unavailable at the time of authorization are avoided and further concerns over the ability to gain unauthorized access to entitlements/authorizations are mitigated.

A system for providing federated user identification and hierarchical computing system entitlement defines first embodiments of the invention. The system includes a plurality of computing systems, wherein each of the computing systems are defined by one or more entitlement zones. Computing systems, as used herein, may include any service, application and the like that requires a user identification and authorization for access. Entitlement zones are configured to provide an authorized user at least one of (i) access to predetermined data associated with a corresponding computing system, and (ii) predetermined functionality within the corresponding computing system. In specific embodiments of the invention, the entitlement zones may be tiered, otherwise referred to as hierarchal, entitlement zones (e.g., entitlement sub-zones and so on) in which access and/or functionality within an entitlement zone may be further segmented/partitioned.

The system further includes a computing device having a memory and at least one processor in communication with the memory. The memory of the computing device stores a federated identification (ID) key having a plurality of keys strings, each key string configured to identify at least one of (i) one of the computing systems and (ii) one or more of the entitlement zones associated with the computing system that a user is authorized to access. The federated ID key is configured to, in response to deciphering, (i) identify the user, and (ii) provide at least a portion of an authorization required for the user to access at least one of (a) one of the computing systems, and (b) one or more entitlement zones associated with the one of the computing systems.

In specific embodiments of the system, the federated ID key further comprises first logic configured to capture and store, as metadata, user authorization credentials required for authorization of the user to access at least one of (i) the one of the computing systems, and (ii) the one of more entitlement zones associated with the one of the computing systems. In such embodiments of the system, the federated ID key further comprises second logic configured to complete the authorization of the user to access the computing system and/or entitlements by comparing and matching the user authorization credentials in the metadata to currently inputted user authentication credentials.

In still further specific embodiments of the system, the federated ID key further comprises logic configured to provide for dynamic changes to the federated ID key by adding, deleting, deleting or reconfiguring key strings to (i) add user authorization of at least one of one or more additional computing systems, and one or more additional entitlement zones, and (ii) delete user authorization of at least one of one or more of the computing systems, and one or more of the entitlement zones. In such embodiments the system may further include a monitoring module configured to monitor at least one of (i) a physical location of the user, and (ii) a usage time of the user using the one or more computing systems. In such embodiments of the system, the dynamic changes to the federated ID key occur in response to monitoring at least one of the physical location of the user (i.e., determining that the user is inside or outside of a predetermined boundary area) and the usage time of the user (i.e., determining that the user has met or exceeded predetermined minimum or maximum usage times). In other related embodiments of the system, the monitoring module may be configured to monitor a physical location of one or more predetermined other users (e.g., family members, employment associates and the like), such that, the dynamic changes to the federated ID key occur based on the physical location of at least one of the one or more predetermined other users in relation to the physical location of the user.

In still further embodiments of the system, one or more of the key strings include logic that is configured delete or deactivate the key string in response to (i) expiration of a predetermined time period, (ii) meeting or exceeding a predetermined number of accesses, or (iii) meeting or exceeding a predetermined number of specified accesses over a predetermined time period.

In other specific embodiments of the system, the federated ID key is initially deployed to the computing device and/or dynamic updates to the federated ID key are performed in response to the user verifying identity.

An apparatus for providing federated user identification and hierarchical computing system entitlement defines second embodiments of the invention. The apparatus includes a computing platform having a memory and a processor in communication with the memory. The apparatus further comprises digitized token in the form of a federated identification (ID) key that is stored in the memory and includes a plurality of key strings, otherwise referred to as pads. Each key string is configured to identify at least one of a computing system, and one or more entitlement zones associated with the computing system that a user is authorized to access. The federated ID key is configured to, in response to deciphering, (i) identify the user, and (ii) provide at least a portion of an authorization required for the user to access at least one of (a) one of the computing systems, and (b) one or more entitlement zones associated with the one of the computing systems.

In specific embodiments of the apparatus the entitlement zones are configured to provide an authorized user at least one of (i) access to predetermined data associated with a corresponding computing system, or (ii) predetermined functionality within the corresponding computing system.

In other specific embodiments of the apparatus, the key strings are further configured to identify one or more entitlement sub-zones associated with the one of the entitlement zones, wherein the entitlement sub-zones are configured to provide an authorized user at least one of (i) access to predetermined data associated with a corresponding entitlement zone, and (ii) predetermined functionality within the corresponding entitlement zone.

In still further specific embodiments of the apparatus the federated ID key further includes first logic configured to capture and store, as metadata, user authorization credentials required for authorization of the user to access at least one of (i) the one of the computing systems, and (ii) the one or more entitlement zones associated with one of the computing systems, and second logic configured to complete the authorization by comparing and matching the user authorization credentials in the metadata to currently inputted user authentication credentials.

In a further specific embodiment of the apparatus, the federated ID key further includes logic configured to provide for dynamic changes to the federated ID key by adding, deleting, deactivating or reconfiguring key strings to (i) add user authorization of at least one of one or more additional computing systems and one or more additional entitlement zones and (ii) remove user authorization from at least one of one or more of the computing systems and one or more of the entitlement zones. In related embodiments of the apparatus the dynamic changes to the federated ID key occur in response to monitoring at least one of (1) a physical location of the user to determine that the user is (i) inside or outside of a predetermined boundary area, or (ii) inside or outside of a predetermined boundary area during a predetermined time period, and (2) usage of the computing system or entitlement zones of the computing system by the user. In other related embodiments of the apparatus the dynamic changes to the federated ID key occur in response to monitoring a physical location of (i) the user and (ii) at least one predetermined other users and comparing the physical location of at least one of the predetermined other users to the physical location of the user.

In still further specific embodiments of the apparatus, one or more of the key strings include logic configured to provide for the key string to be deleted from the key or deactivated in response to (i) expiration of a predetermined time period, (ii) meeting or exceeding a predetermined number of computing system uses, or (iii) meeting or exceeding a predetermined number of specified computing system uses over a predetermined time period.

A computer-implemented method for providing federated user identification and hierarchical computing system entitlement defines third embodiments of the invention. The computer-implemented method is implemented by one or more processing devices and includes deploying a digital token on a computing device. The digital token includes a federated identification (ID) key having a plurality of key strings. Each key string configured to identify at least one of a computing system and an entitlement zone associated with the computing system. The method further includes, in response to receiving a request to access the computing system, receiving the digital token and deciphering the federated identification (ID) key to (i) identify a holder of the digital token and (ii) provide at least a portion of an authorization required for the holder of the digital token to access at least one of the computing system and the entitlement zone.

Thus, according to embodiments of the invention, which will be discussed in greater detail below, the present invention provides for a federated smart user identification (ID) having embedded tiered/hierarchical entitlements. The federated smart user ID comprises an encrypted key having multiple key strings, (i.e., "pads") that create sub-zones/ barriers within the key. Each key string includes logical code and is attached/associated with at least one of (i) a computing system, service, application or the like, and (ii) an entitlement zone of the system, service, application. Thus, the individual key strings define which systems, services, applications and the like the user has access to and the entitlements/authorizations within those systems, services, applications for that user. In addition, key strings can dynamically be added to or deleted from the key to thereby change system/service access authorization and/or system/ service-level entitlement.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
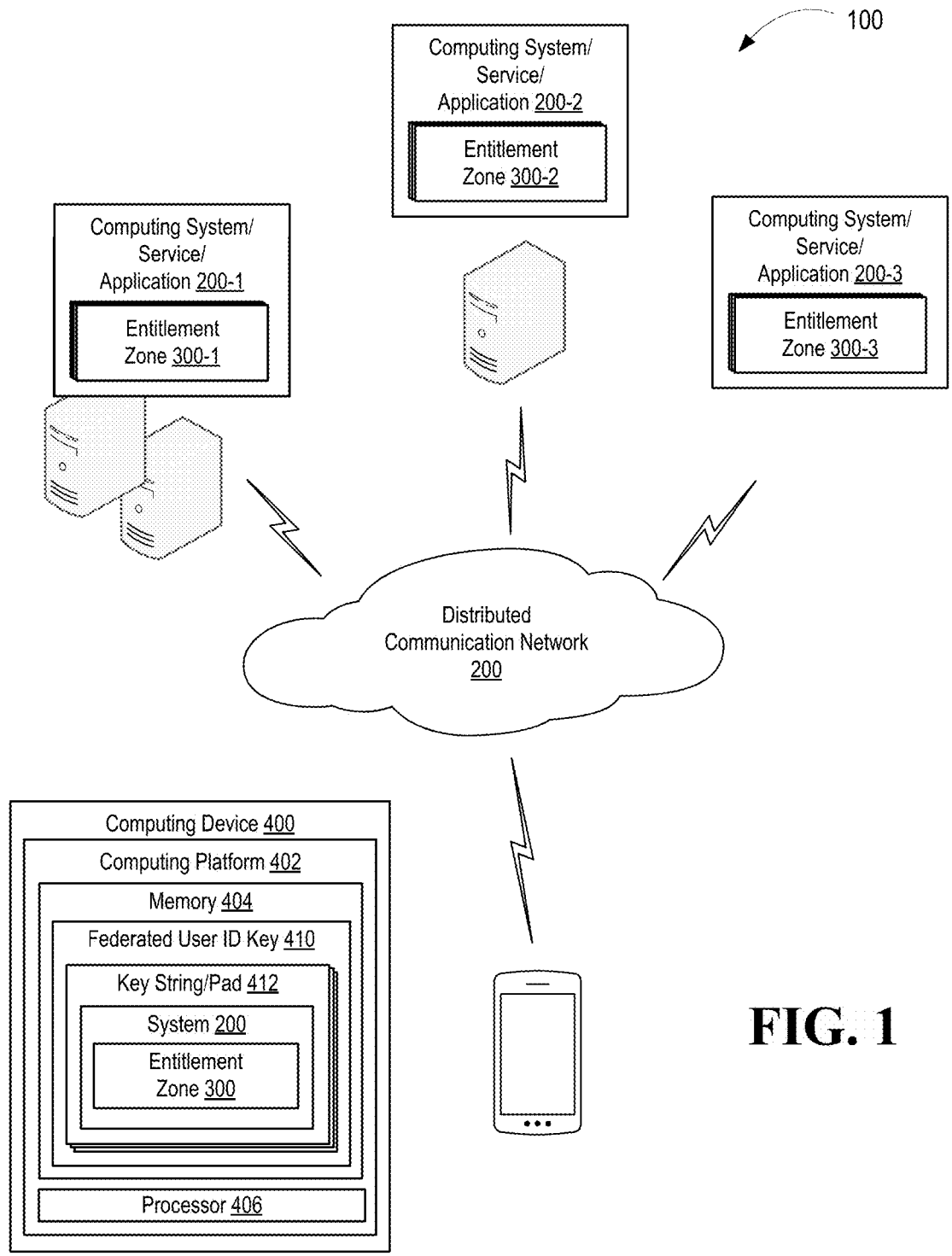
Figure 2:
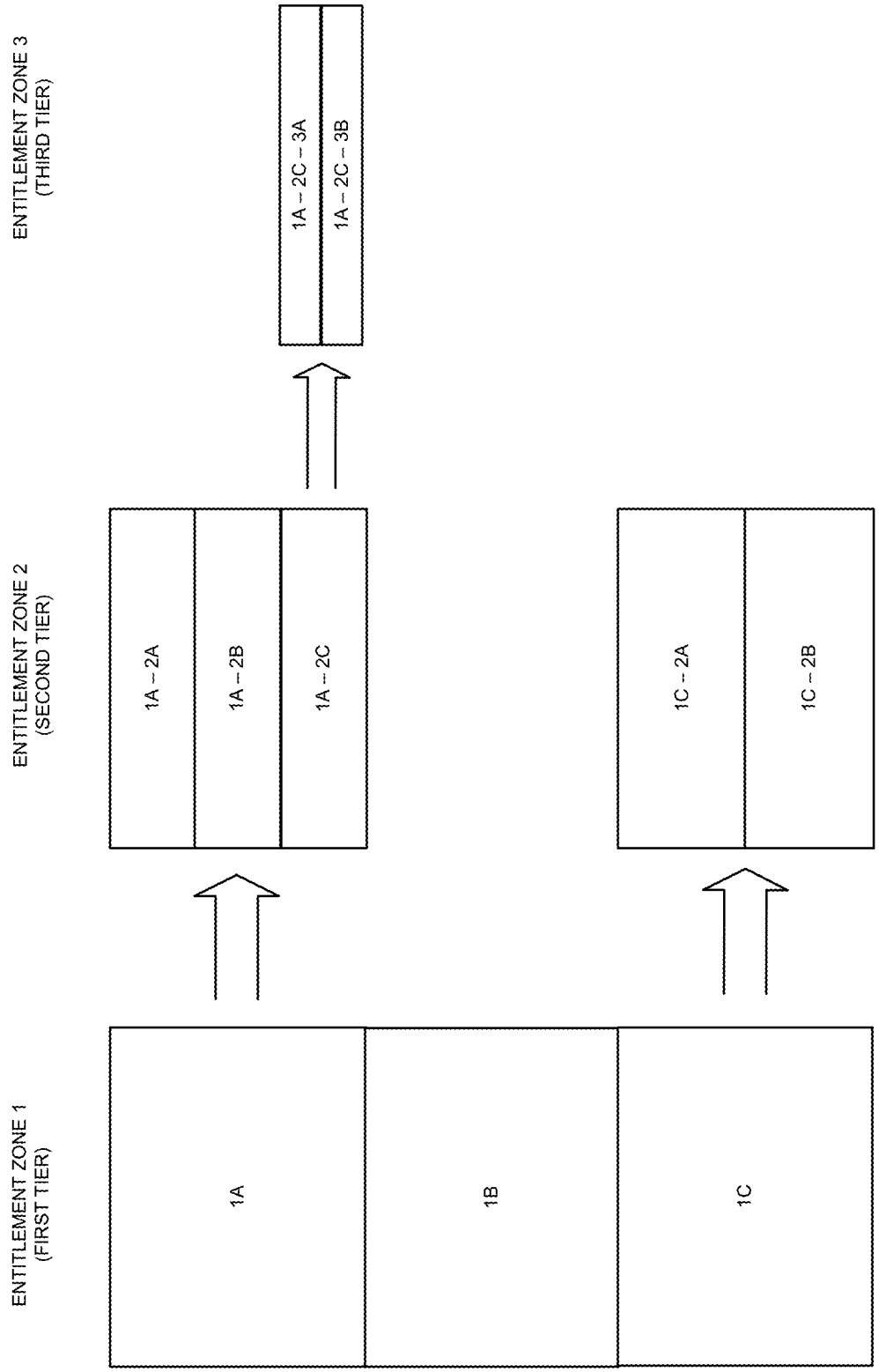
Figure 3:
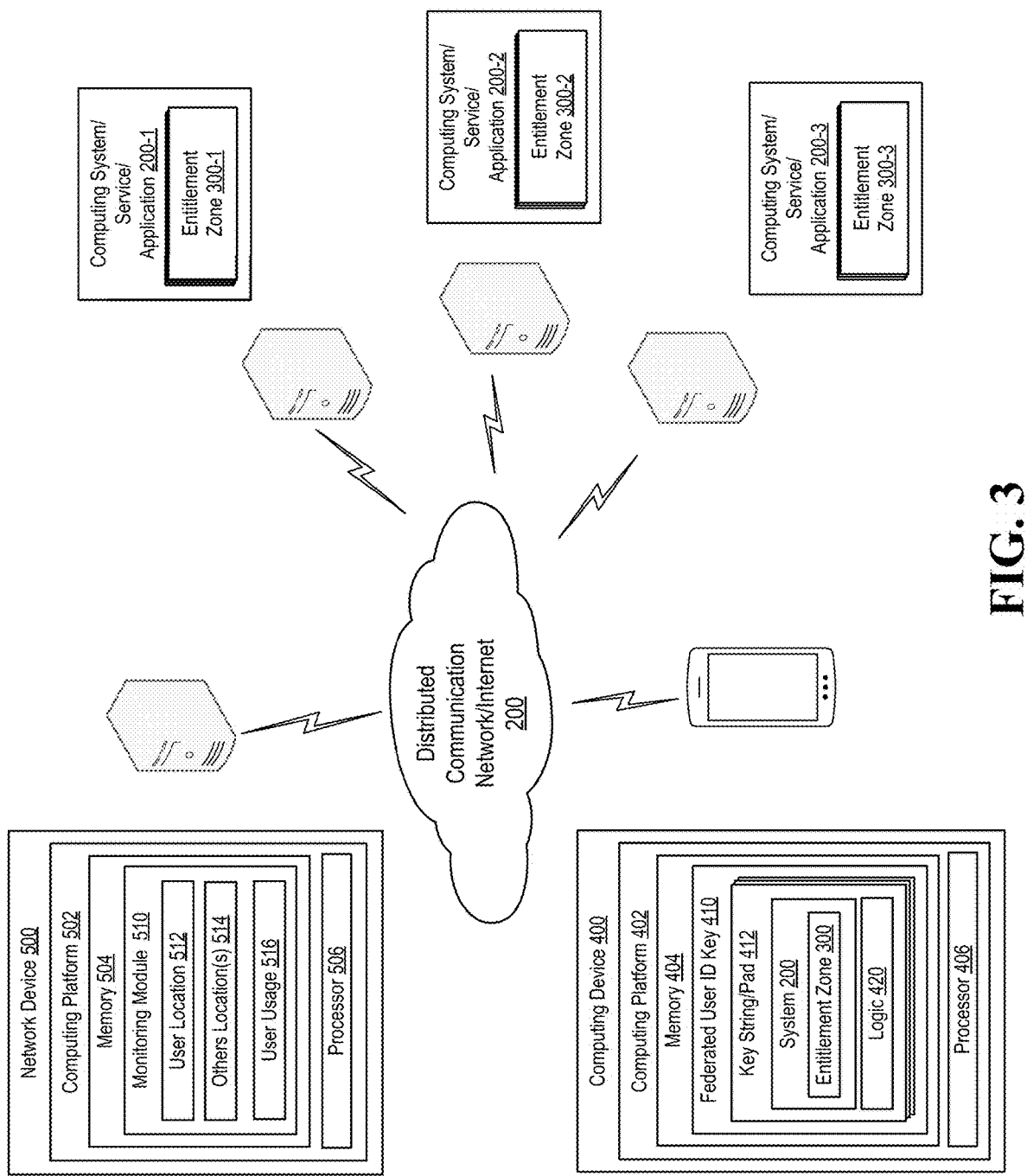
Figure 4:
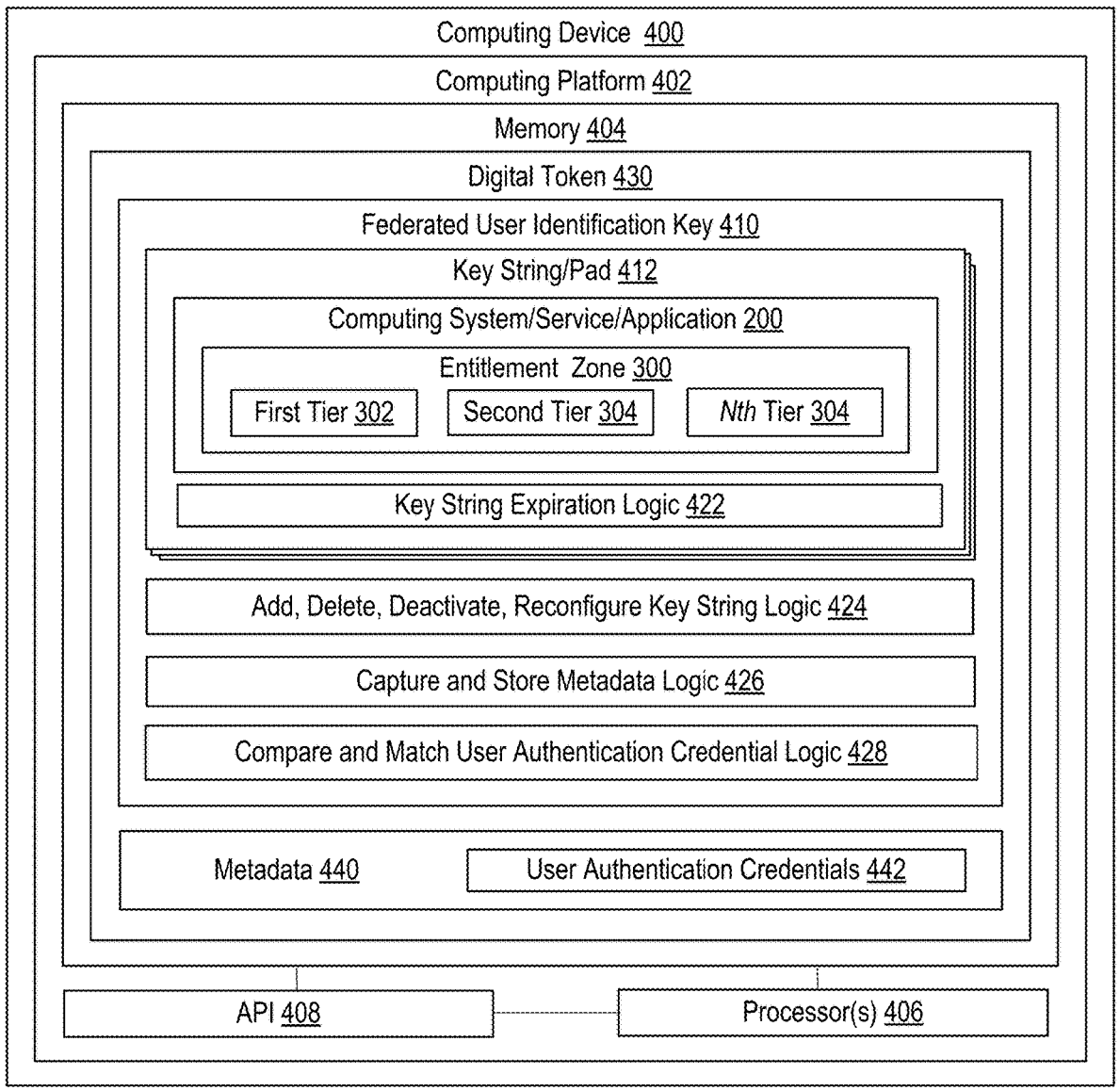
Figure 5:
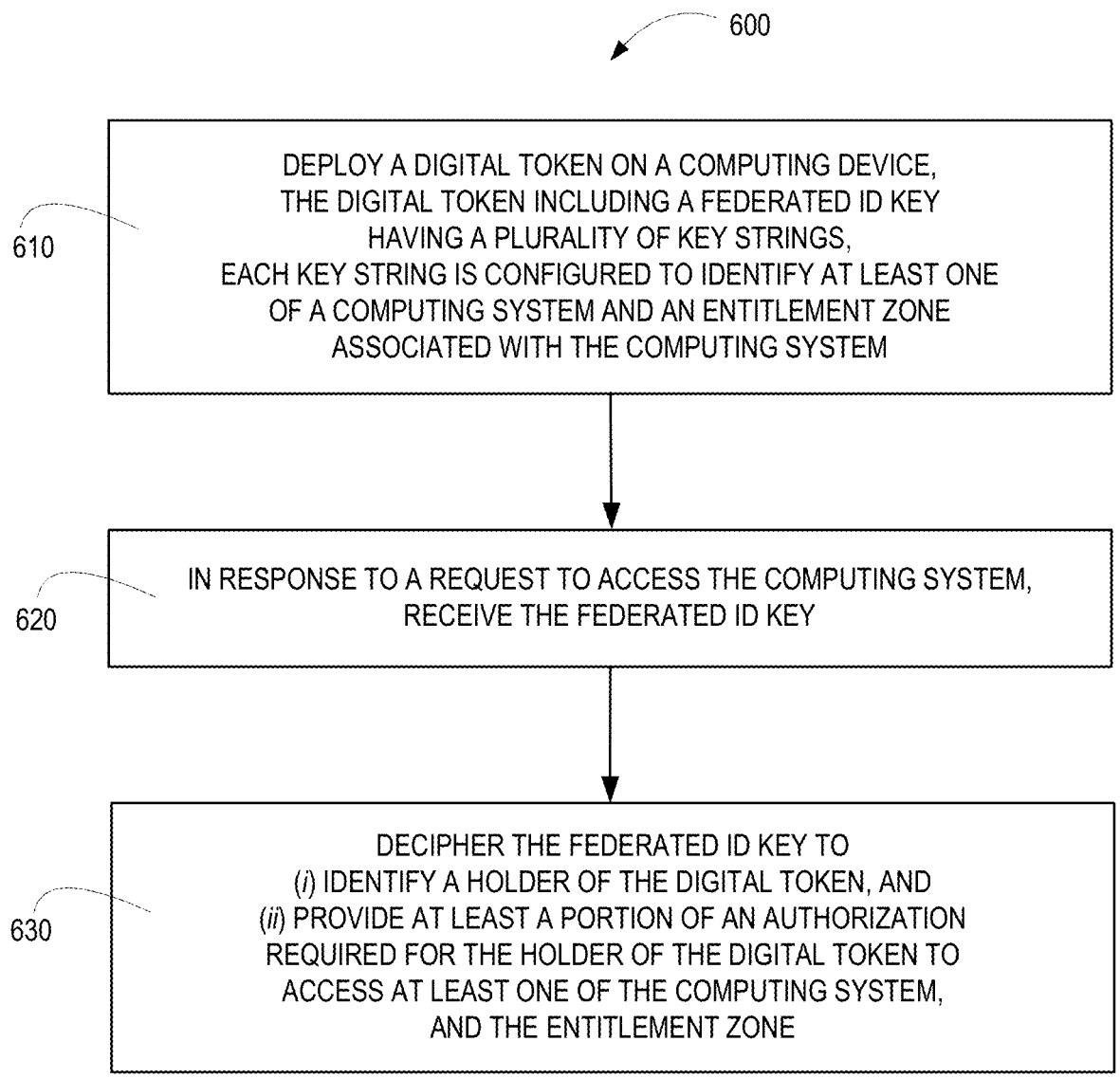

Having thus described embodiments of the disclosure in general terms, reference will now be made to the accompanying drawings, wherein:

FIG. 1 is a schematic diagram of a system for providing federated user identification and tiered/hierarchical computing system entitlement, in accordance with some embodiments of the present disclosure;

FIG. 2 is a schematic diagram of exemplary tiered/ hierarchal entitlement zones, in accordance with some embodiments of the present disclosure;

FIG. 3 is a schematic diagram of alternate system for providing federated user identification and tiered/hierarchical computing system entitlement, in accordance with some alternate embodiments of the present disclosure;

FIG. 4 is a block diagram of a computing device/apparatus configured for providing federated user identification and tiered/hierarchical computing system entitlement, in accordance with some embodiments of the present disclosure; and FIG. 5 is a flow diagram of a method for providing federated user identification and tiered/hierarchical computing system entitlement, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for a federated smart user identification (ID) having tiered/hierarchical entitlements. The federated nature of the user ID means that the user ID is configured to provide access to multiple different computing systems, services, applications or the like, in some instance, most if not all, systems, service, applications or the like that require authorization within an enterprise.

The federated smart user ID of the present invention takes the form of an encrypted key having multiple key strings, otherwise referred to herein as "pads" that create sub-zones/barriers within the key. Each key string or pad includes logical code and is attached/associated with at least one of (i) a computing system, service, application or the like, and (ii) an entitlement zone of the system, service, application. Thus, the individual key strings define which systems, services, applications and the like the user has access to and the entitlements/authorizations within those systems, services, applications that the user has. Further, as explained further below, the tiered/hierarchal entitlement zones, referred to herein as sub-zones) of the present invention allow for greater granularity in the entitlements/authorizations that may be provided to a user.

In accordance with specific embodiments of the invention, the key strings are dynamic, such that, key strings may be added or deleted from the key or otherwise changed as a means for adding or deleting to a user's access privileges and/or entitlements/authorizations. Such changes to the key strings may occur based on the user's need to gain or, in some instances decrease, further access or functionality within a system, service, application or the like. As discussed in more detail below other factors, such as time, user location, user system/service usage may be used in determining the need to change key strings (i.e., add or delete access privileges and/or entitlements/authorizations).

In specific embodiments, the federated smart user ID is a digital token stored in a user device (e.g., mobile device, smart watch/bracelet, key fob, USB flash drive or the like). The digitized user ID, typically with encryption over the top, means that the user has no knowledge of the user ID (such as a user name or the like, as typical of conventional user IDs) and the entitlements/authorizations provided to the user. Since, the user/key holder has no knowledge of the user ID, the user can not divulge and/or lend the user ID to other individuals, thus, providing a further level of security (i.e., preventing unauthorized entities from accessing the systems, services, application or the like).

Since the entitlements/authorizations are stored within the user ID/key there is no need to retrieve the entitlements/authorizations from a database at the time of authorization. This means that problems associated with the database being unavailable at the time of authorization are avoided and further concerns over the ability to gain unauthorized access to database-stored entitlements/authorizations are mitigated.

Turning now to the figures, FIG. 1 a schematic diagram is provided of an exemplary system 100 for providing federated user identification and tiered/hierarchical computing system entitlement, in accordance with embodiments of the present invention. Communication between the various entities of system 100, which be wired or wireless, is implemented via a distributed communication network 200 which may include the Internet and/or one or more intranets. The system includes a plurality of computing systems 200-1, 200-2, 200-3 otherwise referred to herein as services, applications or the like. The term "computing system" as used herein refers to any system, module, application, or the like that requires user identification for the purpose to gaining authorized access to the system, module application or the like and/or the functionality within the system, module, application. A "computing system" as used herein may be software, hardware and any combination thereof. In many instances, the computing system requires user identification and some form of user passcode, biometric data or the like, which is collectively referred to herein as the user authentication credentials. In the illustrated embodiment of FIG. 1 the computing systems 200-1, 200-2, 200-3 are shown as being executed on or otherwise associated with a network-based device, such as a server or the like. While in the illustrated embodiment of FIG. 1 each computing system 200-1, 200-2 and 200-3 is shown as being executed on or associated with a separate network-based device, it should clear to the reader that more than one computing system 200-1, 200-2, 200-3 may be executed on or associated with a single network-based device and any one computing system 200-1, 200-2, 200-3 may be executed on or otherwise associated with multiple different network-based devices.

Each computing system 200-1, 200-2, 200-3 is defined by one or more entitlement zones 300-1, 300-2 and 300-3. An "entitlement zone" as used herein is a predetermined set of privileges/authorizations associated with the computing system that are granted to one or more users. In their broadest scope the predetermined set of privileges/authorizations defining an entitlement zone 300-1, 300-2 and 300-3 may encompass all of the access and functionality offered by the computing system (i.e., complete or full access and functionality). While in narrower scope the predetermined set of privileges/authorizations defining an entitlement zone 300-1, 300-2 and 300-3 may be limited by access of specific data types, data elements or specific functionality within the computing system. As described in more detail in relation to FIG. 2, specific embodiments of the invention provide for the entitlement zones 200-1, 200-2, 200-3 to be tiered/hierarchal, such that segments/portions of access and/or functionality can be defined within an entitlement zone, so-called entitlement sub-zones creating secondary, tertiary and so-on entitlement zones. The entitlement zones and, more specifically, the predetermined set of privileges/authorization associated with the entitlement zones may be configured by the entity controlling the computing system or, in some embodiments, by the user.

The system 100 additionally includes a computing device 400 having a computing platform 402 including a memory 404 and at least one processor 406 in communication with the memory 406. The computing device 400 may include any apparatus configured to store, and in some embodiments transmit, data. Thus, the computing device 400 may take the form of a mobile communication device (as shown in FIG. 1), a personal computing device, a laptop computing device, a wearable device (e.g., smart watch, smart bracelet or the like), a jump drive or the like. The memory 404 of computing device 400 stores federated user identification key 410, which may take the form of a digital token having encryption over the top. The federated user ID key 410 includes a plurality of key strings 412, otherwise referred to herein as "pads", each key string is configured to, upon deciphering/decryption, identify a computing system 200-1, 200-2, 200-3 and, in some instances, one or more of the entitlement zones 300-1, 300-2, 300-3 associated with a computing system 200-1, 200-2, 200-3. Thus, each key string forms a barrier within the overall federated user ID key 410. Only the computing system associated with the key string 412 has the ability to decipher/decrypt the key string to identify which entitlement zones 300-1, 300-2, 300-3 the user is authorized to access.

The federated nature of the user ID key 410 is apparent, in that, the key 410 may be configured to include key strings 412 associated with various different computing systems 300 and, as such user identification to the various different computing systems is provided through the use/presentation of the one single (i.e., federated) user ID key 410.

In specific embodiments of the system, a key string 412 is associated with a computing system or the computing system 200 and one entitlement zone 300. In such embodiments of the invention, a user's federated user ID key 41—may include more than one key string 412 for a computing system in the event that the user is authorized to access more than one entitlement zone 300. In other specific embodiments of the invention, a key string may be associated with the computing system 200 and multiple entitlement zones 300, such as, all of the entitlement zones 300 associated with the computing system 200 that a user is authorized to access or all of the entitlement zones 300 within a horizontal or vertical chain of entitlement zones (as discussed in relation to FIG. 2) associated with the computing system 200 that a user is authorized to access.

In response to presenting the federated user ID key 410 to one of the computing systems 200-1, 200-2 or 200-3 and deciphering/decrypting the key 410, the user is identified and at least a portion of the authorization is provided for the user to access the computing system and/or the entitlement zones associated with the computing system. In further embodiments of the invention, other authorization credentials, such as a passcode, biometric data or the like may be required, in addition to the federated user ID key 410, for the user to gain access to the computing system and/or the entitlement zones.

FIG. 2 is a schematic diagram of an example of tiered/hierarchal entitlement zones 300, in accordance with embodiments of the present invention. The entitlement zones in FIG. 2 may be applicable to one specific computing system 200 (shown in FIG. 1) or they may be applicable to multiple different computing systems 200 (e.g., all of the computing systems to which the federated user ID key 410 provides access). The entitlement zones 300 include a first tier of entitlement zones 1A, 1B and 1C, which are shown in a vertical column in FIG. 2. It should be noted that a first tier of entitlement may include more or less zones. In one example, the first tier of entitlement zones may be broad high-level tiering, such as associated with different groupings of computing systems, different data types, different functionality or the like. In this regard a user may be assigned (i.e., authorized to use/access) one or more of the entitlement zones 1A, 1B or 1C. In other embodiments of the invention, the first tier of entitlement zones may be mutually exclusive, such that, a user may be assigned (i.e., authorized to use/access) only one of the entitlement zones 1A, 1B or 1C within the first tier.

In the illustrated example of FIG. 2 both the 1A and 1C entitlement zones have second tier entitlement zones, which further partition/segment the entitlements/privileges allotted in the corresponding first tier entitlement zones. For example, entitlement zone 1A has three distinct second tier entitlement zones 1A-2A, 1A-2B and 1A-2C and entitlement zone 1C has two distinct second tier entitlement zones 1C-2A and 1C-2B. For example, the first tier of entitlements zones may be associated with different groupings of computing systems, the second tier of entitlement zones may be associated with different data types or different functionality within the specified grouping of computing systems. In another example, the first tier of entitlements zones may be associated with different data types (e.g., confidential data), the second tier of entitlement zones may be associated with different functionality (e.g., read only, edit, copy, and the like). Further, in the example of FIG. 2 the second tier entitlement zone 1A-2C has third tier entitlement zones, which further partition/segment the entitlements/privileges allotted to the corresponding second tier entitlement zone. For example, second tier entitlement zone 1A-2C has two distinct third tier entitlement zones 1A-2C-3A and 1A-2C-3B. For example, in those embodiments of the invention in which the second tier entitlement zones are associated with different data types, the third tier entitlement zones may be associated with different functionality or different sets of functionality and the like. As previously discussed in relation to FIG. 1, a key string 412 may comprise one entitlement zone, all of the entitlement zones with a vertical tier or all of the entitlement zones within a horizontal chain (e.g., entitlement zones within the first, second, third tier and so on).

Referring to FIG. 3 a schematic diagram is provided of exemplary system 100 for providing federated user identification and tiered/hierarchical computing system entitlement, in accordance with alternate embodiments of the present invention. The system 100 includes the distributed communication network 200, computing systems 300-1, 300-2, 300-3 and computing device 400 shown in discussed in relation to FIG. 1. In the illustrated embodiment of FIG. 3, the key string 412 and/or the federated user ID key 410 includes executable logic 420 to perform various tasks/functions associated with the key 410 and/or key strings 412. Such logic 420 may include, but is not limited to, logic configured to dynamically add, delete, deactivate and/or reconfigure a key string 412 so as to effect changes in the computing systems and/or entitlement zones (i.e., dynamically change a user's entitlement/authorization in terms of computing systems which the user is authorized to access or entitlements/authorizations within a computing system) Additionally logic 412 may be configured to fully authenticate a user for accessing a computer system and/or entitlement zones (i.e. capture and store further authentication credentials (passcode, biometric data) and compare/match to user inputted authentication credentials).

System 100 additionally includes network device 500 having a computing platform 502 including a memory 504 and at least processor 506 in communication with memory 504. Memory 504 stores a monitoring module 510 that is configured to monitor various factors that influence the need to change entitlement/privileges for a specified user (i.e., dynamically add/delete or reconfigure key strings to change entitlement zones). While the illustrated embodiment of FIG. 3 depicts the monitoring module 510 as being stored and executed within a separate network device 500, in other embodiments of the invention all or a portion of the monitoring module 510 may be stored and/or executed on another computing system 200 device and/or the user's computing device 400. In specific embodiments of the system, the monitoring module is configured to monitor the physical/geographic location 512 of the user, such that changes to the user's authorized computing systems and or entitlement/privileges within the authorized computing systems occur based on the user's current location. The location of the user may be determined within the computing device 400 by a location-determining mechanism, GPS or the like and may, subsequently be communicated to the monitoring module 510. For example, certain boundary areas may be predefined (e.g., a place of residence boundary area, a place of employment boundary area), such that, in the event that the user is determined to be inside the boundary area the user is authorized for using/accessing more computing systems or the entitlements/privileges associated with an authorized computing system are increased. Conversely, certain boundary areas may be predefined or dynamically defined (e.g., high traffic/unsecure areas), such that, in the event the user is determined to be inside the boundary area less computing systems are authorized and/or less entitlements/privileges associated with an authorized computing system are afforded to the user.

In other embodiments of the invention, the monitoring module 510 is configured to monitor the physical/geographic location 514 of other individuals, such as individuals associated with the user (e.g., family members, work associates and the like). In such embodiments of the inventions the other individuals may acquiesce in the monitoring of their location and the location may be determined by location-determining mechanisms located on their respective mobile communication devices. In such embodiments, of the invention a user's access to computing systems and/or entitlements/privileges may be changed based on the other individual's location(s) in relation to the location of the user. For example when the other individual or predetermined numbers of other individuals are within a predetermined distance of the user, the user may be authorized for use of more computing systems or the entitlements/privileges associated with an authorized computing system may be increased.

In other embodiments of the invention, the monitoring module 510 may be configured to monitor the user's usage 516 of the computing system, such, that more or less entitlements/privileges are afforded the user based on their usage. Usage may be determined based on the number of accesses and or time period of access over a predetermined period of time.

In specific embodiments of the invention, such as in those embodiments in which the monitoring module 510 is executed on the computing device 400, logic within the federated user ID key 410 or key strings 412 may be accessible to the monitoring module 510, such that, a determination of a need to change computing systems and/or entitlements results in dynamic, real-time changes to the key strings (i.e., adding a key string, deleting a key string, deactivating/reactivating a key string, reconfiguring/regenerating a key string or the like) to result in changes to the entitlement zones. In other embodiments of the invention, in which the monitoring module 510 is in the control of the computing system 200 or some other external entity, the need to change computing systems and/or entitlements may be communicated to the computing systems, such that the next time the user attempts to access the computing system 200 (and the key 410 is presented to the computing system 200), the computing system implements changes to the key strings (i.e., adding a key string, deleting a key string, deactivating/reactivating a key string, reconfiguring/regenerating a key string or the like).

Referring to FIG. 4 a block diagram is depicted of the computing device 400, in accordance with embodiments of the present invention. The computing device, which may be mobile communication device or the like, includes a computing platform 402 having a memory 404 and at least one processor 406 in communication with the processor. The memory 404 may comprise volatile and non-volatile memory, such as read-only and/or random-access memory (RAM and ROM), EPROM, EEPROM, flash cards, or any memory common to computing platforms). Moreover, memory 404 may comprise cloud storage, such as provided by a cloud storage service and/or a cloud connection service.

Further, computing platform 402 also includes at least one processor 406, which may be an application-specific integrated circuit ("ASIC"), or other chipset, logic circuit, or other data processing device. Processor 406 may execute one or more application programming interface (APIs) 408 that interfaces with any resident programs, such as logic associated with the federated user ID key 410 and/or key strings 412 and any external programs. Processor 406 may include various processing subsystems (not shown in FIG. 4) embodied in hardware, firmware, software, and combinations thereof, that enable the functionality of computing platform 402 and the operability of the computing platform 402 on the distributed communication network 200 (shown in FIG. 1). For example, processing subsystems allow for initiating and maintaining communications and exchanging data with other networked devices. For the disclosed aspects, processing subsystems of processor 406 may include any subsystem used in conjunction with logic 422, 424, 426 and 428, and related tools, routines, sub-routines, algorithms, sub-algorithms, sub-modules thereof.

Computing platform 402 may additionally include a communications module (not shown in FIG. 4) embodied in hardware, firmware, software, and combinations thereof, that enables electronic communications between the computing platform 402 and other network devices, such as those shown in FIGS. 1 and 3. Thus, communication module may include the requisite hardware, firmware, software and/or combinations thereof for establishing and maintaining a network communication connection.

Memory 404 of computing platform 402 stores federated user identification key 410, which may take the form of a digital token 430 having encryption over the top. The federated user ID key 410 includes a plurality of key strings 412, otherwise referred to herein as "pads", each key string 412 is configured to, upon deciphering/decryption, identify a computing system200/service/application or the like and, in some instances, one or more of the entitlement zones 300 associated with a computing system 200. As discussed in relation to FIG. 2, the entitlement zones 300 may include a first tier 302 entitlement zone, a second tier 304 entitlement or any subsequent nth tier 304 entitlement zone.

In response to presenting the federated user ID key 410 to one of the computing systems 200 and deciphering/decrypting the key 410, the user is identified and at least a portion of the authorization is provided for the user to access the computing system and/or the entitlement zones associated with the computing system. In further embodiments of the invention, other authorization credentials, such as a passcode, biometric data or the like may be required, in addition to the federated user ID key, for the user to gain access to the computing system and/or the entitlement zones.

The key string 412 may include key string expiration logic 414 which is configured to delete or deactivate a key string (i.e., remove one or more entitlement zones 300) in response to a meeting or exceeding a predetermined expiration event. The expiration event may include, but is not limited to, a predetermined date and/or time, a predetermined number of accesses/uses (e.g., a single use entitlement/privilege), a predetermined number of accesses/uses over predetermined time period and the like. In other embodiments of the invention, key string and/or entitlement zone expiration/use may be controlled by within a specified tier of the entitlement zones, such that the entitlement zone itself limits the entitlement for a specified time period and/or a specified number of uses.

The federated user ID key 410 and/or the key string 412 may include additional logic for controlling the key 410 and/or the key strings 412. For example, the key 410 or, in some embodiments, the key string 412 may include logic 424 configured to control dynamic changes to the key strings 412, such as, addition of key string (i.e., adding authorization to computing systems and/or entitlement zones), deletion of key strings (i.e., deleting authorization to computing systems and/or entitlement zones), deactivating/reactivating key strings (i.e., temporarily suspending and subsequently reactivating authorization to a computing system and/or entitlement zone, reconfiguring a key string (i.e., changing computer system authorization and/or entitlement zones) and the like.

In still further embodiments of the invention, the federated user ID key 410 and/or key strings 412 may include logic 426 for capturing and storing metadata 440 associated with accessing a computer system and/or using entitlements/privileges, such as historical usage data, which may subsequently be used to alter entitlement zones and the like. In specific embodiments of the invention, the metadata 440 that is captured and stored may include other user authentication credentials 442 (e.g., passcode, biometrics and the like) that may be required by a computing system, in addition to the federated user ID key 410, as a means of obtaining authorization to access a computing system 200 and/or entitlement zones 300. In such embodiments of the invention, the key 410 and/or key strings 412 may include logic 428 that is configured to compare and match the stored user authentication credentials 442 to a current user input of their authentication credentials as a means for completing the user authentication process (i.e., granting the user access to the computing system and/or entitlement zones). In such embodiments of the invention, in which both the user's privileges (i.e., entitlement zones) and the standard for user authentication credential are stored on the user's device, full user authentication can take place at the user device-level, thus, eliminating the need to access the network or communicate with a computing system or some third-party entity for the purpose of user authentication. By having user authentication based solely at the user device, user authentication can occur without invoking the network-based user authentication resources. Such authentication may provide for a more secure means of authentication and/or a backup means for authentication if the network-based authentication resources are down.

Referring to FIG. 5 a flow diagram is present of a method 600 for providing federated user identification and tiered/hierarchical computing system entitlement, in accordance with embodiments of the present invention. At Event 610, a digital token is deployed on a computing device. The token includes a federated Identification (ID) key having a plurality of key strings, i.e., pads. Each key string is configured to identify at least one of a computing system and at least one entitlement zone associated with the computing system. In specific embodiments of the invention each key string is configured to identify at least one entitlement zone, where each entitlement zone is associated with one or more computing systems. Thus, the federated ID key provides the user identification for a plurality of different computing systems. The computing system may comprise a service, module, application or any other software and/or hardware entity require user identification and authorization. An entitlement zone as used herein is a set of one or more privileges/authorizations associated with one or more computing systems. The privileges/authorizations may grant specific access and/or functionality associated with one or more computing systems. In specific embodiments of the invention, the deployment of the token on the device is preceded by the user performing some form of user identification.

At Event 620 in response to a user requesting access to a computing system, the federated ID key is received. In specific embodiments of the invention the federated ID key is communicated from a user device to an identifying/authorizing entity over short-range wireless communication, such as Near-Field Communication (NFC) or the like. In other embodiments of the invention, the federated ID key may be communicated via physical contact (e.g., USB or the like) of the user device with a receiving device of the identifying/authorizing entity.

At Event 630, the federated ID key is deciphered/decrypted to identify a holder of the digital token (i.e., authorized user) and provide at least a portion of the authorization required for the holder of the digital token to access the computing system and obtain privileges/authorization associated with one or more entitlement zones. In specific embodiments of the invention authorization may further include receipt of other user authentication credential(s), such as passcode, biometric data or the like.

Thus, present embodiments of the invention providing systems, methods, computer program product and/or the like provide for a federated smart user identification (ID) having embedded tiered/hierarchical entitlements. The federated smart user ID comprises an encrypted key having multiple key strings, (i.e., "pads") that create sub-zones/barriers within the key. Each key string includes logical code and is attached/associated with at least one of (i) a computing system, service, application or the like, and (ii) an entitlement zone of the system, service, application and the like. Thus, the individual key strings define which systems, services, applications and the like the user has access to and the entitlements/authorizations within those systems, services, applications for that user. In addition, key strings can dynamically be added to or deleted from the key to thereby change system/service access authorization and/or system/service-level entitlement.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing federated user identification and hierarchical computing system entitlement, the system comprising:
a plurality of computing systems, wherein each of the computing systems are defined by one or more entitlement zones;
a computing device having a memory and at least one processor in communication with the memory, wherein the memory of the computing device stores a federated identification (ID) key that is only assigned to only one user and has a plurality of keys strings, each key string configured to identify at least one of (i) one of the computing systems and (ii) one or more of the entitlement zones associated with the one of the computing systems that the user is authorized to access,
wherein the federated ID key is configured to, in response to deciphering, (i) identify the user, and (ii) provide at least a portion of an authorization required for the user to access at least one of (a) one of the computing systems, and (b) one or more entitlement zones associated with the one of the computing systems, and
wherein the federated ID key further comprises logic configured to provide for dynamic changes to the federated ID key by adding, deleting, deactivating or reconfiguring key strings to (i) add user authorization of at least one of one or more additional computing systems, and one or more additional entitlement zones, or (ii) delete user authorization of at least one of one or more of the computing systems, and one or more of the entitlement zones; and a monitoring module stored in the memory executable by one or more of the at least one processor and configured to monitor usage time of the user using the one or more computing systems, wherein the dynamic changes to the federated ID key are triggered in response to monitoring the usage time of the user.

2. The system of claim 1, wherein the entitlement zones are configured to provide an authorized user at least one of (i) access to predetermined data associated with a corresponding computing system, and (ii) predetermined functionality within the corresponding computing system.

3. The system of claim 1, wherein the key strings are further configured to identify one or more entitlement sub-zones associated with the one of the entitlement zones, wherein the entitlement sub-zones are configured to provide an authorized user at least one of (i) access to predetermined data associated with a corresponding entitlement zone, and (ii) predetermined functionality within the corresponding entitlement zone.

4. The system of claim 1, wherein the federated ID key further comprises first logic configured to capture and store, as metadata, user authorization credentials required for authorization of the user to access at least one of (i) the one of the computing systems, and (ii) the one of more entitlement zones associated with the one of the computing systems.

5. The system of claim 4, wherein the federated ID key further comprises second logic configured to complete the authorization by comparing and matching the user authorization credentials in the metadata to currently inputted user authentication credentials.

6. The system of claim 1, wherein the monitoring module is further configured to monitor a physical location of a mobile device in possession of the user, wherein the dynamic changes to the federated ID key occur in response to monitoring the physical location of the mobile device of the user.

7. The system of claim 6, wherein the dynamic changes to the federated ID key occur in response to monitoring the physical location of the mobile device of the user to determine that the user is inside or outside of a predetermined boundary area within one or more predetermined time periods.

8. The system of claim 6, wherein the monitoring module is further configured to monitor a physical location of other mobile devices in possession of one or more predetermined other users, wherein the dynamic changes to the federated ID key occur based on the physical location of at least one of the other mobile devices of the one or more predetermined other users in relation to the physical location of the user.

9. The system of claim 1, wherein one or more of the key strings include logic that is configured to delete or deactivate the key string in response to (i) expiration of a predetermined time period, (ii) meeting or exceeding a predetermined number of accesses, or (iii) meeting or exceeding a predetermined number of specified accesses over a predetermined time period.

10. The system of claim 1, wherein the federated ID key is initially deployed to the computing device and dynamic updates to the federated ID key are performed in response to the user verifying identity.

11. An apparatus for providing federated user identification and hierarchical computing system entitlement, the apparatus comprising:
a computing platform including:
a memory;
a processor in communication with the memory;
a federated identification (ID) key assigned to only one user and stored in the memory, executable by the processor and including a plurality of key strings, each key string configured to identify at least one of a computing system, and one or more entitlement zones associated with the computing system that the user is authorized to access, wherein the federated ID key is configured to, in response to deciphering, (i) identify the user, and (ii) provide at least a portion of an authorization required for the user to access at least one of (a) one of the computing systems, and (b) one or more entitlement zones associated with the one of the computing systems;
logic included in the federated ID key that is executable by the processor and configured to provide for dynamic changes to the federated ID key by adding, deleting, deactivating or reconfiguring key strings to (i) add user authorization of at least one of one or more additional computing systems, and one or more additional entitlement zones, or (ii) delete user authorization of at least one of one or more of the computing systems, and one or more of the entitlement zones; and
a monitoring module stored in the memory executable by the processor and configured to monitor usage time of the user using the one or more computing systems, wherein the dynamic changes to the federated ID key are triggered in response to monitoring the usage time of the user.

12. The apparatus of claim 11, wherein the entitlement zones are configured to provide an authorized user at least one of (i) access to predetermined data associated with a corresponding computing system, or (ii) predetermined functionality within the corresponding computing system.

13. The apparatus of claim 11, wherein the key strings are further configured to identify one or more entitlement sub-zones associated with the one of the entitlement zones, wherein the entitlement sub-zones are configured to provide an authorized user at least one of (i) access to predetermined data associated with a corresponding entitlement zone, and (ii) predetermined functionality within the corresponding entitlement zone.

14. The apparatus of claim 11, wherein the federated ID key further comprises:
first logic configured to capture and store, as metadata, user authorization credentials required for authorization of the user to access at least one of (i) the one of the computing systems, and (ii) the one or more entitlement zones associated with one of the computing systems, and
second logic configured to complete the authorization by comparing and matching the user authorization credentials in the metadata to currently inputted user authentication credentials.

15. The apparatus of claim 11, wherein the monitoring module is further configured to monitor a physical location of a mobile device in possession of the user to determine that the user is (i) inside or outside of a predetermined boundary area, or (ii) inside or outside of a predetermined boundary area during a predetermined time period.

16. The apparatus of claim 15, wherein the dynamic changes to the federated ID key are further triggered in response to monitoring the physical location of (i) the mobile device in possession of the user and (ii) a physical location of other mobile devices in possession of corresponding predetermined other users and comparing the physical location of at least one of the predetermined other users to the physical location of the user.

17. The apparatus of claim 11, wherein one or more of the key strings include logic configured to provide for the key string to be deleted from the key or deactivated in response to (i) expiration of a predetermined time period, (ii) meeting or exceeding a predetermined number of computing system uses, or (iii) meeting or exceeding a predetermined number of specified computing system uses over a predetermined time period.

* * * * *